(12) United States Patent
Wang et al.

(10) Patent No.: US 10,989,991 B2
(45) Date of Patent: Apr. 27, 2021

(54) ADJUSTMENT DEVICE AND PROJECTION DEVICE USING THE SAME

(71) Applicant: Coretronic Corporation, Hsin-Chu (TW)

(72) Inventors: Yun-Sheng Wang, Hsin-Chu (TW); Mao-Min Fu, Hsin-Chu (TW); Yen-Po Chang, Hsin-Chu (TW); Chien-Ming Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/702,561

(22) Filed: Dec. 4, 2019

(65) Prior Publication Data

US 2020/0341354 A1 Oct. 29, 2020

(30) Foreign Application Priority Data

Apr. 29, 2019 (CN) .......................... 201920600681.3

(51) Int. Cl.
*G03B 21/14* (2006.01)
*H04N 9/31* (2006.01)

(52) U.S. Cl.
CPC ......... *G03B 21/145* (2013.01); *G03B 21/142* (2013.01)

(58) Field of Classification Search
CPC .... G03B 21/145; G03B 21/142; G03B 21/14; H04N 9/3141
See application file for complete search history.

(56) References Cited

U.S. PATENT DOCUMENTS

| 6,059,413 A * | 5/2000 | Okubo ................. H04N 9/3147 348/E5.138 |
| 2007/0108028 A1* | 5/2007 | Lu .......................... G03B 21/00 200/16 C |

FOREIGN PATENT DOCUMENTS

| TW | I283331 B | 7/2007 |
| TW | 200815897 A | 4/2008 |

\* cited by examiner

*Primary Examiner* — Ryan D Howard (57) ABSTRACT

An adjustment device for adjusting an up-down displacement of an optical engine module of a projection device includes a bracket, at least one adjustment zone, at least one flexible element, and at least one adjustment element. The bracket is disposed inside the projection device. The at least one adjustment zone is located at the optical engine module. There is a gap between the optical engine module and the bracket. The at least one flexible element is abutted between the bracket and the optical engine module. The at least one adjustment element is movably disposed through the at least one adjustment zone. A distance between the at least one adjustment zone of the optical engine module and the bracket is adjusted by an operation of the at least one adjustment element. A projection device using the adjustment device is also provided.

8 Claims, 11 Drawing Sheets

ADJUSTMENT DEVICE AND PROJECTION DEVICE USING THE SAME

CROSS-REFERENCE TO RELATED APPLICATION

This application claims the priority benefit of China application no. 201920600681.3, filed on Apr. 29, 2019. The entirety of the above-mentioned patent application is hereby incorporated by reference herein and made a part of this specification.

FIELD OF THE INVENTION

The invention relates to a projection device, and more particularly to an adjustment device arranged inside projection device to adjust the up-down displacement of an optical engine module and a projection device using the adjustment device.

BACKGROUND OF THE INVENTION

With the booming development of technology, projection device has been applied to various fields such as from consumer products to high-tech products, and its application range has been expanding. The current projection device does not simply appear as a projector but can be gradually installed in many different system applications, such as video games, street lights, artificial intelligence robots, and the like. The presentation of the projection image is particularly valued in the application of the projection device, and appropriate adjustment is required once the projection image is skewed.

In the existing projection device, the projection image can be adjusted by adjusting the height of the optical engine module, such as adding washer(s) onto the bottom of the optical engine module so as to avoid the skew of the projection image by selecting the thickness and quantity of the washer. However, it is impossible to adding the washer for adjusting the projection image while observing the projection image, so the adjustment is not easy. Further, the projection skew of each optical engine module is not the same, resulting in different thickness or quantity of added washers, and therefore it is time consuming and laborious to adjust. Further, washer itself has tolerance, and the composition of multiple washers results in cumulative tolerances that may not meet the requirement for fine-tuning.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an adjustment device and a projection device, wherein a projection image may be adjusted in real time by the adjustment device, so that the working time of the adjustment is greatly saved and the adjustment is relatively easy.

Other advantages and objects of the invention may be further illustrated by the technical features broadly embodied and described as follows.

In order to achieve one or a portion of or all of the objects or other objects, an embodiment of the invention provides an adjustment device for adjusting an up-down displacement of an optical engine module of a projection device. The adjustment device includes a bracket, at least one adjustment zone, at least one flexible element, and at least one adjustment element. The bracket is disposed inside the projection device. The at least one adjustment zone is located at the optical engine module. There is a gap between the optical engine module and the bracket. The at least one flexible element is abutted between the bracket and the optical engine module. The at least one adjustment element is movably disposed through the at least one adjustment zone and a distance between the at least one adjustment zone of the optical engine module and the bracket is at least adjusted by an operation of the at least one adjustment element.

In order to achieve one or a portion of or all of the objects or other objects, an embodiment of the invention provides a projection device, which includes an optical engine module, a projection lens module, and an adjustment device. The projection lens module is connected to the optical engine module. The projection lens module is configured to project an image beam out of the projection device. The adjustment device includes a bracket, at least three adjustment zones, at least one flexible element, and at least three adjustment elements. The at least three adjustment zones are evenly distributed at the optical engine module. There is a gap between the optical engine module and the bracket. The at least one flexible element is abutted between the bracket and the optical engine module. The at least three adjustment elements are respectively movably disposed through the at least three adjustment zones and a distance between at least one of the at least three adjustment zones of the optical engine module and the bracket is at least adjusted by an operation of at least one of the at least three adjustment elements.

In summary, in the projection device of the embodiments of the invention, with the provision of the adjustment device, the projection image may be instantly adjusted without the need to disassemble the optical engine module, thereby greatly saving the working time. Further, the adjustment may be performed while observing the projection image, and therefore the adjustment is easier. Further, no washers are required in the adjustment device, thus avoiding tolerances from conventional washers or cumulative tolerances from multiple washers. Further, the height of the optical engine module may be fine-adjusted to a position within the specification so that the unexpected skew may not be generated in the projection image. Further, under the premise of not necessary to use the metal precision washer with higher unit price, the cost of mold making may be effectively reduced.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
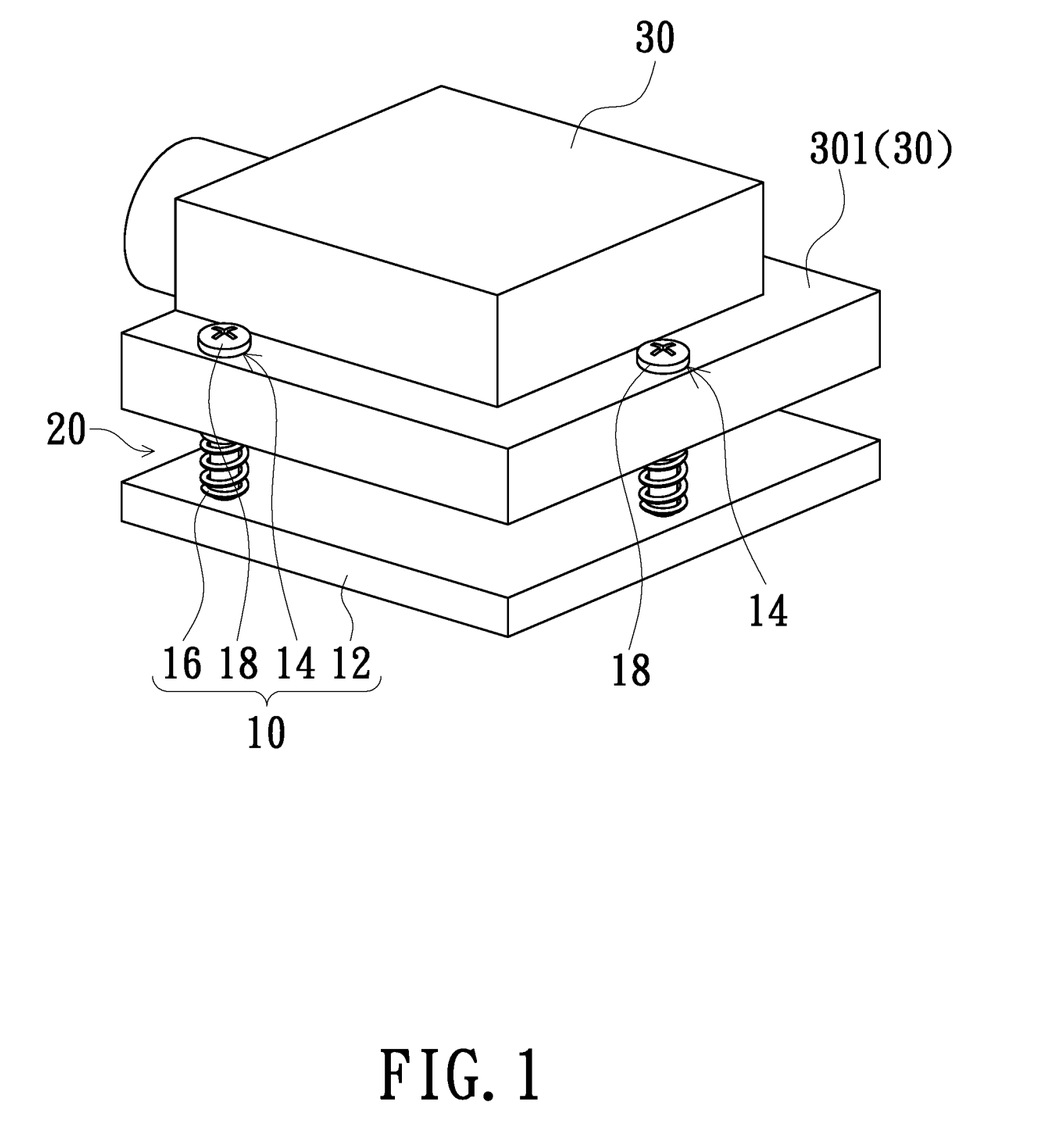
FIG. 1 is a schematic structural view of an adjustment device according to a first embodiment of the invention.

FIG. 1 is a schematic structural view of an adjustment device according to a first embodiment of the invention. The projection device (not shown) includes an adjustment device 10 and an optical engine module 30. The adjustment device 10 is used for adjusting an up-down displacement of the optical engine module 30 of the projection device. As shown in FIG. 1, the adjustment device 10 includes a bracket 12, an adjustment zone 14, a flexible element 16, and an adjustment element 18. The bracket 12 is disposed inside the projection device; for example, the bracket 12 is disposed on an optical engine module mounting portion inside the projection device or a casing of the projection device. The adjustment zone 14 is located at the optical engine module 30, and there is a gap 20 between the optical engine module 30 and the bracket 12. In an embodiment, the optical engine module 30 includes a fixing base 301. The fixing base 301 is located above the bracket 12, and the gap 20 is formed between the fixing base 301 and the bracket 12. The adjustment zone 14 is located at the fixed base 301; for example, the adjustment zone 14 is located at a portion such as a periphery or a corner of the fixing base 301. In an embodiment, the quantity of the adjustment zones 14 is, for example, three. The flexible element 16 is abutted between the bracket 12 and the fixed base 301 of the optical engine module 30. The flexible element 16 includes a spring or a spring plate. The adjustment element 18 may be movably disposed through the adjustment zone 14. The adjustment element 18 is used for changing a distance between the adjustment zone 14 and the bracket 12 by the operation of the adjustment element 18.

Figure 2A:
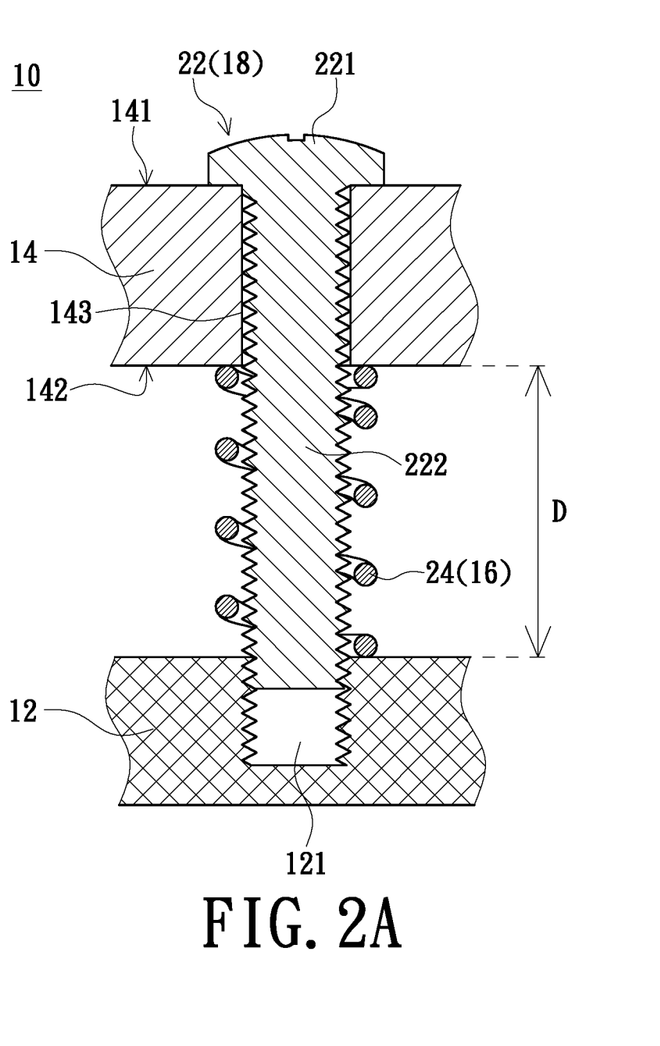
FIGS. 2A and 2B are schematic views showing the operation of changing the distance between an adjustment zone and a bracket by using an adjustment element according to an embodiment of the invention.
Figure 2B:
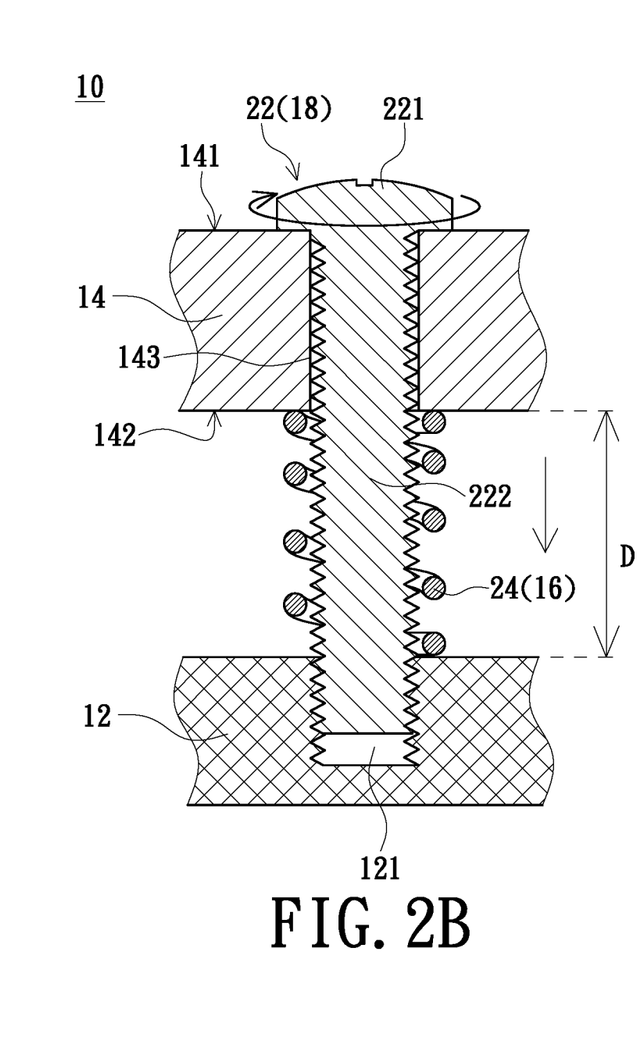

Follow the above description. FIGS. 2A and 2B are schematic views showing the operation of changing the distance between an adjustment zone and a bracket by using an adjustment element according to an embodiment of the invention. The adjustment element 18 shown in FIG. 1 is, for example, an adjustment screw 22, and the flexible element 16 shown in FIG. 1 is, for example, a spring 24. As shown in FIGS. 2A and 2B, the adjustment screw 22 includes a head portion 221 and a thread body 222, and the thread body 222 is connected to the head portion 221. In an embodiment, the adjustment zone 14 includes a first surface 141 and a second surface 142 opposite to each other. The second surface 142 faces the bracket 12. The adjustment zone 14 is provided with a through hole 143 penetrating the first surface 141 and the second surface 142. In an embodiment, the inner diameter of the through hole 143 is smaller than the outer diameter of the head portion 24 of the adjustment screw 22. Further, the bracket 12 is provided with a first screw hole 121, and the position of the first screw hole 121 substantially corresponds to the position of the through hole 143 of the adjustment zone 14.

As shown in FIG. 2A, the thread body 222 of the adjustment screw 22 is inserted into the through hole 143 downwardly, penetrated through the through hole 143, and screwed to a part of the first screw hole 121 of the bracket 12, so that the head portion 221 of the adjustment screw 22 is abutted against the first surface 141 of the adjustment zone 14. As shown in FIG. 2B, when the adjustment screw 22 is rotated, the thread body 222 continues to be screwed downward into the first screw hole 121, and such that the head portion 221 of the adjustment screw 22 pushes the adjustment zone 14 to be biased in a direction toward the bracket 12.

Follow the above description. As shown in FIGS. 2A and 2B, the spring 24 is disposed between the through hole 143 and the first screw hole 121 and sleeved on the thread body 222. The opposite ends of the spring 24 are respectively abutted against the bracket 12 and the second surface 142 of the adjustment zone 14. There is a distance D between the bracket 12 and the second surface 142 of the adjustment zone 14. The spring 24 is compressed as the adjustment zone 14 is biased in a direction toward the bracket 12 due to the thread body 222 is screwed downward into the first screw hole 121. Alternatively, when the adjustment screw 22 is rotated in the opposite direction so that the thread body 222 is screwed out the first screw hole 121 upwardly, the elastic restoring force of the spring 24 pushes the adjustment region 14 to be biased in a direction away from the bracket 12, wherein meanwhile the thread body 222 is still partially screwed in the first screw hole 121 and the head portion 221 is still abutted against the first surface 141. As such, the distance D between the bracket 12 and the second surface 142 of the adjustment zone 14 changes as the adjustment screw 22 adjusts to drive the adjustment zone 14 downward or upward.

Figure 3:
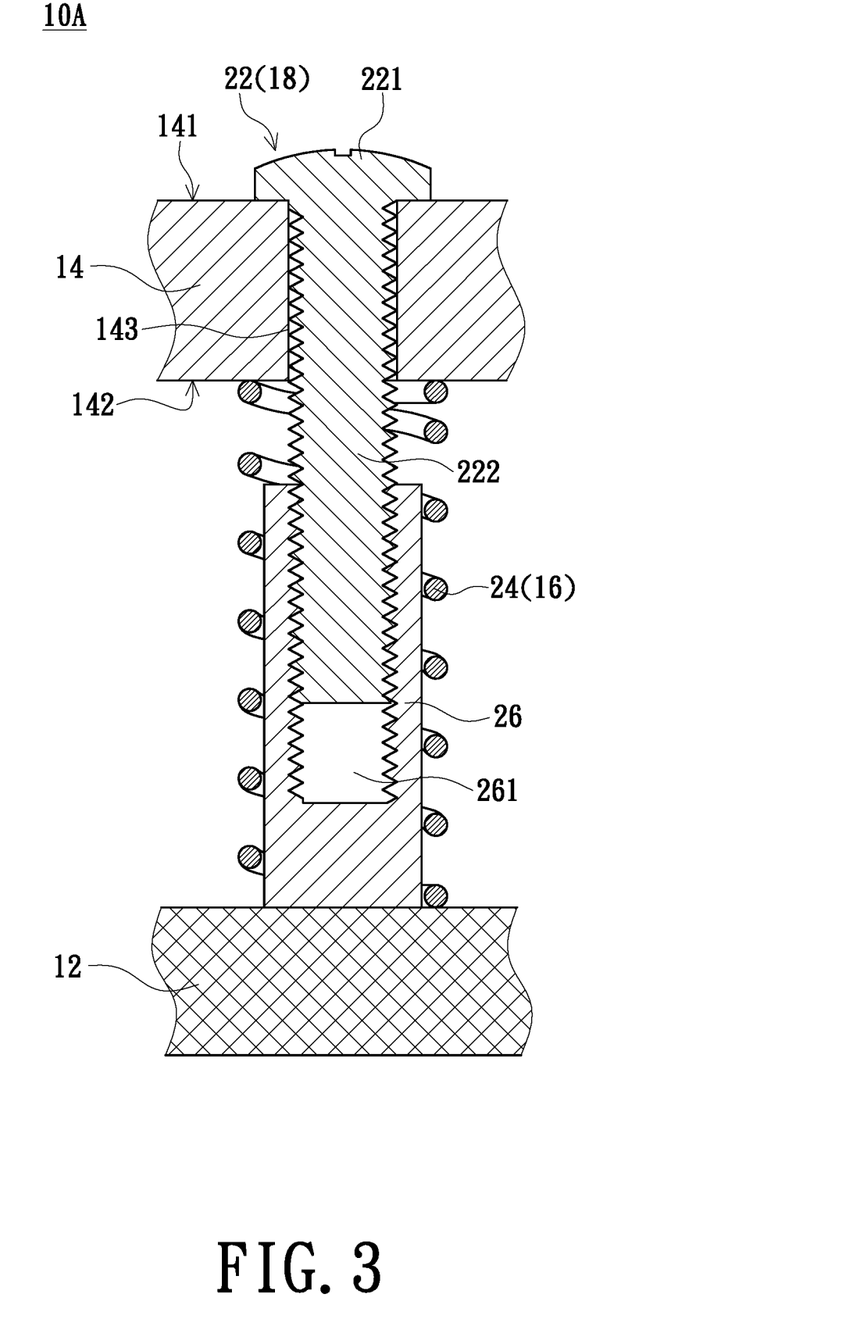
FIG. 3 is a schematic partial structural view of an adjustment device according to a second embodiment of the invention.

FIG. 3 is a schematic partial structural view of an adjustment device according to a second embodiment of the invention. The adjustment device 10A of the second embodiment differs from the adjustment device 10 of the first embodiment in that the adjustment device 10A further includes a fixing post 26 and the spring 24 is sleeved on the fixing post 26. As shown in FIG. 3, the fixing post 26 is disposed on the bracket 12 and located between the bracket 12 and the adjustment zone 14. The fixing post 26 is provided with a second screw hole 261. In an embodiment, the second screw hole 261 penetrates one end of the fixing post 26 adjacent to the adjustment zone 14, and the second screw hole 261 corresponds to the through hole 143. In the second embodiment, the spring 24 is sleeved on the outer surface of the fixing post 26, the length of the spring 24 is slightly longer than the height of the fixing post 26, and the opposite ends of the spring 24 are respectively abutted against the bracket 12 and the second surface 142 of the adjustment zone 14. The provision of the fixing post 26 facilitates the securing of the spring 24 when the optical engine module 30 is assembled to the bracket 12, so as to avoid the sliding of the spring 24 and improve the assembly convenience. Further, the fixing post 26 may be integrally formed with the bracket 12, but the invention is not limited thereto.

Follow the above description. In the second embodiment as shown in FIG. 3, the thread body 222 of the adjustment screw 22 is inserted into the through hole 143 downwardly, penetrated through the through hole 143, and screwed into a part of the second screw hole 261, so that the head portion 221 of the adjustment screw 22 is abutted against the first surface 141 of the adjustment zone 14. When the adjustment screw 22 is rotated, the thread body 222 continues to be screwed downward into the second screw hole 261, and such that the head portion 221 of the adjustment screw 22 pushes the adjustment zone 14 to be biased in a direction toward the bracket 12 and meanwhile the adjustment zone 14 compresses the spring 24.

In an un-illustrative embodiment, the second screw hole 261 may penetrate the opposite ends of the fixing post 26 and may further correspondingly communicate to the first screw hole 121 (shown in FIGS. 2A and 2B) of the bracket 12. Therefore, the thread body 222 of the adjustment screw 22 may be also screwed downwardly, penetrated through the second screw hole 261, and screwed into the first screw hole 121 of the bracket 12.

Figure 4:
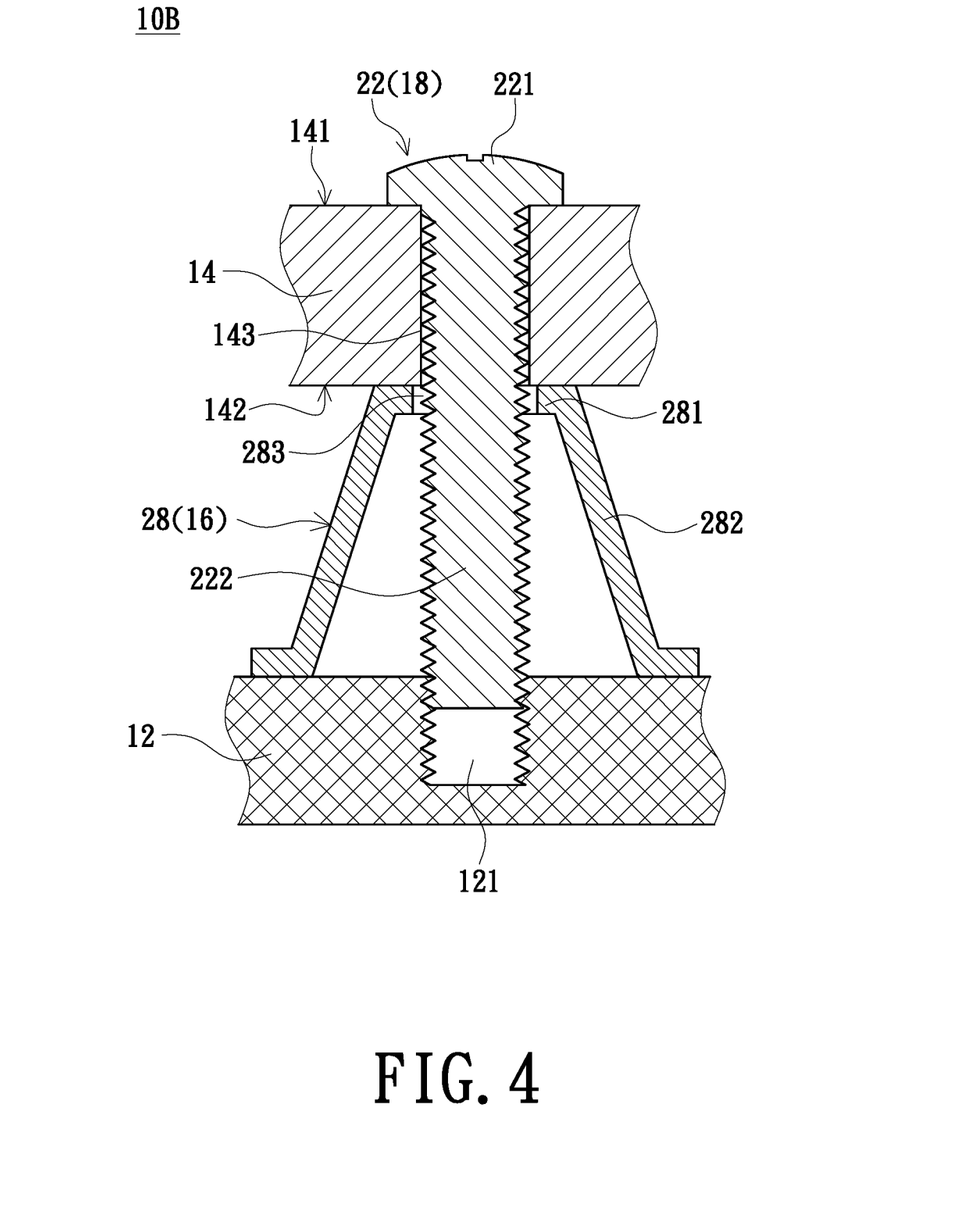
FIG. 4 is a schematic partial structural view of an adjustment device according to a third embodiment of the invention.

FIG. 4 is a schematic partial structural view of an adjustment device according to a third embodiment of the invention. The adjustment device 10B of the third embodiment differs from the adjustment device 10 of the first embodiment mainly in that the flexible element 16 of the adjustment device 10B of the third embodiment is a spring plate 28. As shown in FIG. 4, the spring plate 28 is disposed on the bracket 12. In an embodiment, the spring plate 28 includes an elastic base 281 and a fixing portion 282. The spring plate 28 is fixed to the bracket 12 by the fixing portion 282 and the elastic base 281 is abutted against the second surface 142 of the adjustment zone 14. A perforation 283 is formed in the spring plate 28, and the perforation 283 substantially corresponds to the through hole 143 of the adjustment zone 14 and the first screw hole 121 of the bracket 12. The thread body 222 of the adjustment screw 22 is inserted into the through hole 143 downwardly, penetrated through the through hole 143, inserted into the perforation 283 of the spring plate 28, and screwed into a part of the first screw hole 121 on the bracket 12, so that the head portion 221 of the adjustment screw 22 is abutted against the first surface 141 of the adjustment zone 14. When the adjustment screw 22 is rotated, the thread body 222 continues to be screwed downward into the first screw hole 121, and such that the head portion 221 of the adjustment screw 22 pushes the adjustment zone 14 to be biased in a direction toward the bracket 12 and meanwhile the adjustment zone 14 compresses the elastic base 281 and/or the fixing portion 282.

In the adjustment device 10/10A/10B of the first, second and third embodiments, since the pitch of the outer threads of the thread body 222 may be smaller than the pitch of the inner threads of the first screw hole 121/the second screw hole 261, there may be a gap between the protrusion of the outer threads of the thread body 222 and the protrusion of the inner threads of the first screw hole 121/the second screw hole 261 when the outer threads of the thread body 222 are engaged with the inner threads of the first screw hole 121/the second screw hole 261. Thus, by the provision of the flexible element 16 of the adjustment device 10/10A/10B of the embodiments, the outer threads of the thread body 222 are tightly engaged with the inner threads of the first screw hole 121/the second screw hole 261 by the elastic restoring force of the spring 24 or the spring plate 28, thereby maintaining the stability when the adjustment zone 14 is adjusted to a certain height.

Figure 5:
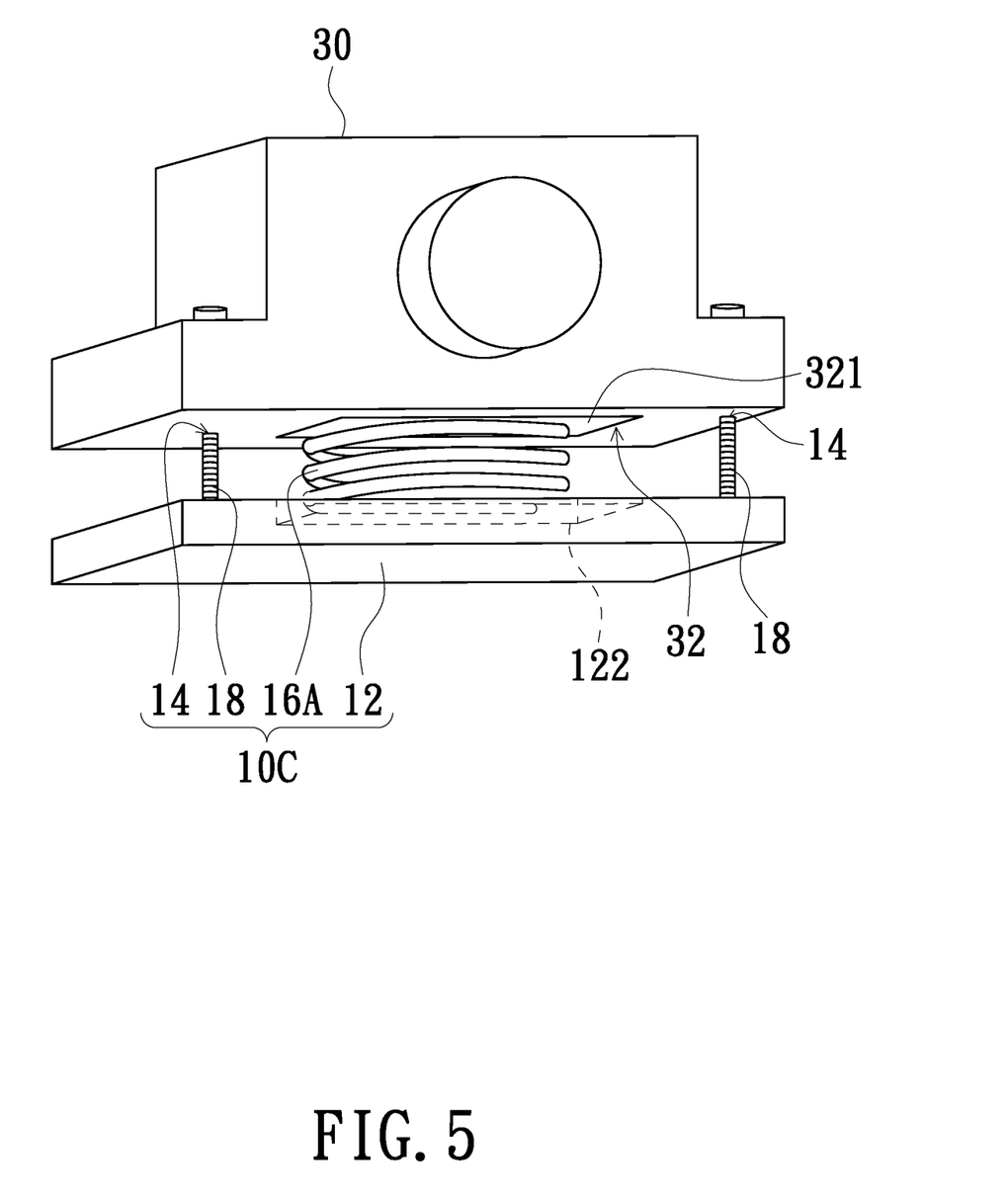
FIG. 5 is a schematic structural view of an adjustment device according to a fourth embodiment of the invention.

FIG. 5 is a schematic structural view of an adjustment device according to a fourth embodiment of the invention. As shown in FIG. 5, the adjustment device 10C of the fourth embodiment differs from those in the above embodiments in that the flexible element 16A of the adjustment device 10C in the fourth embodiment is not located between the adjustment zone 14 and the bracket 12 and is not sleeved on the thread body 222 of the adjustment screw 22 or the fixing post 26. In the embodiment, the quantity of the adjustment elements 18 is at least three, and the quantity of the adjustment zones 14 is at least three. As shown in FIG. 5, the optical engine module 30 includes, for example, three adjustment zones 14 (only two adjustment zones 14 are labeled due to the viewing angle in FIG. 5) and a supporting zone 32, wherein the supporting zone 32 is located among the three adjustment zones 14. In an embodiment, the supporting zone 32 is formed with a first engagement slot 321 facing the bracket 12, the bracket 12 is formed with a second engagement slot 122, and the second engagement slot 122 corresponds to the first engagement slot 321. The flexible element 16A is located between the bracket 12 and the supporting zone 32. In an embodiment, the opposite ends of the flexible element 16A are respectively engaged with the first engagement slot 321 and the second engagement slot 122. Each of the adjustment zones 14 is provided with a movable adjustment element 18, and the distance between each of the adjustment zones 14 and the bracket 12 is adjusted by the respective adjustment element 18. The flexible element 16A is compressed when the adjustment zone 14 is moved in a direction toward the bracket 12 by the adjustment of the adjustment element 18.

The opposite ends of the flexible element 16A may be respectively adhered to or screwed in the first engagement slot 321 and the second engagement slot 122. Alternatively, the opposite ends of the flexible element 16A may be respectively directly placed in the first engagement slot 321 and the second engagement slot 122 and are pressed and fixed by the optical engine module 30 and the bracket 12. In an embodiment, when the flexible element 16A is a spring, a groove (not shown) may be respectively disposed in the first engagement slot 321 and the second engagement slot 122 and the opposite ends of the spring are inserted in the grooves for fixing.

Figure 6A:
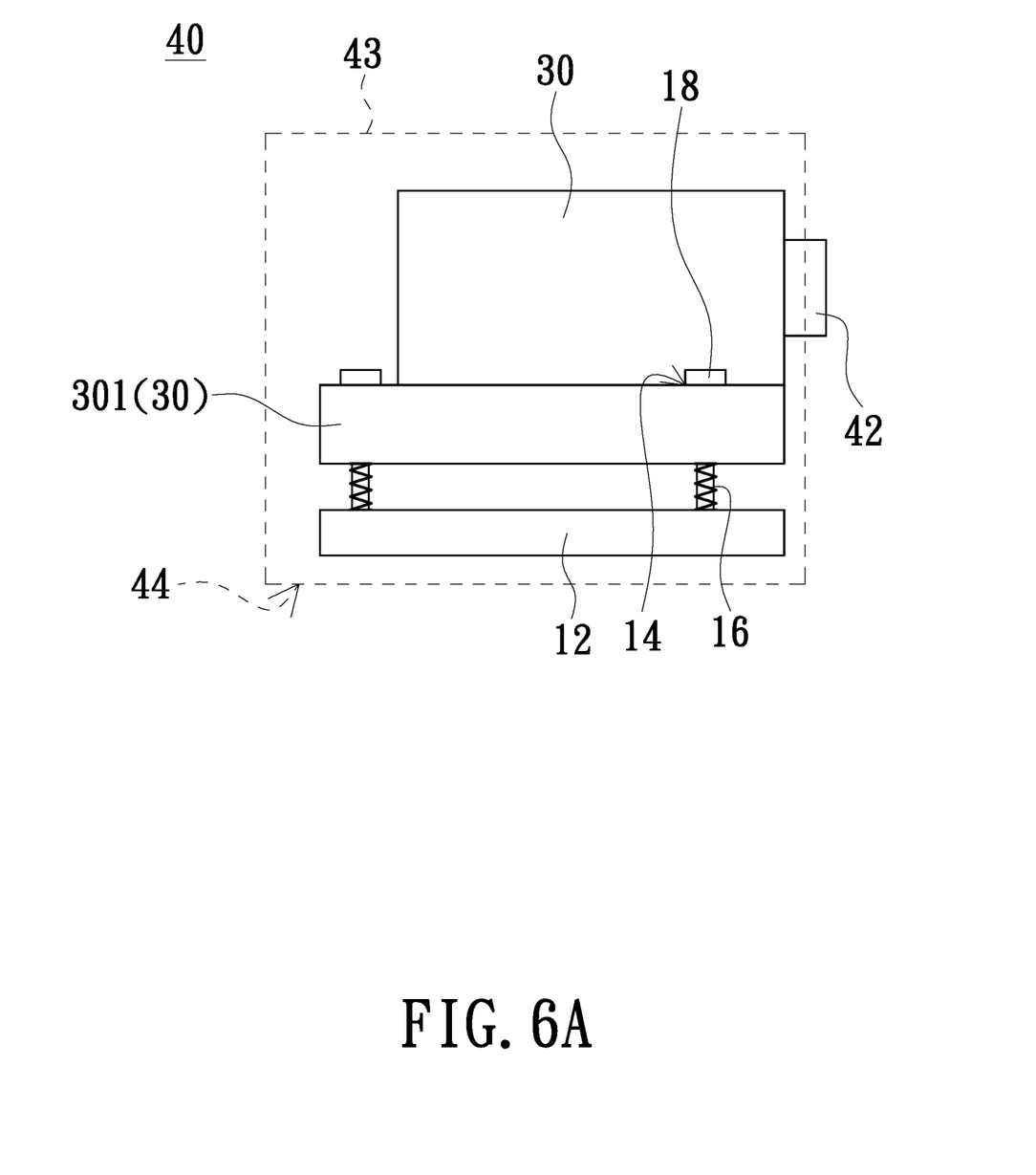
FIG. 6A is a schematic side perspective view of a projection device according to an embodiment of the invention.
Figure 6B:
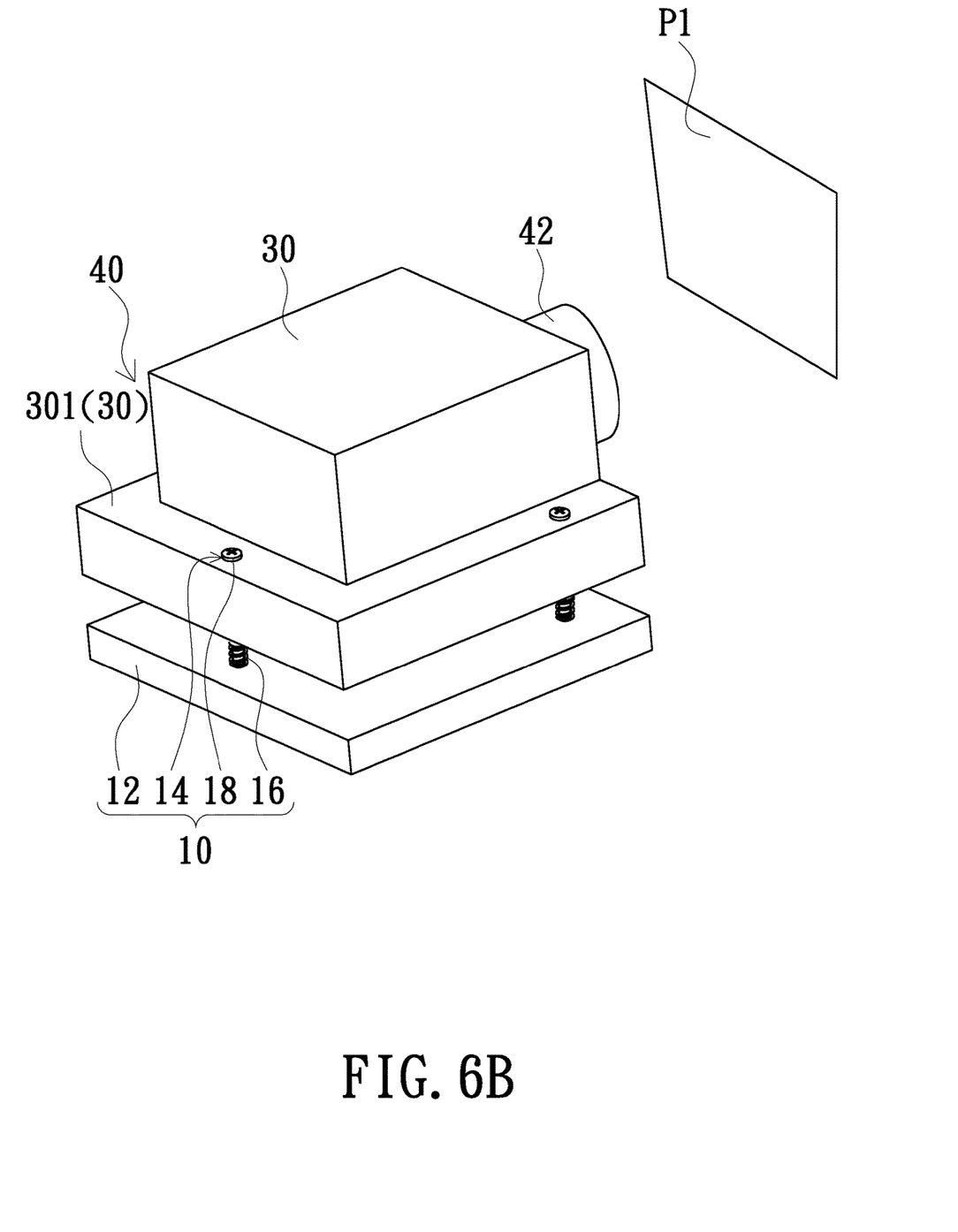
FIGS. 6B and 6C are schematic structural views of the projection device of FIG. 6A in different states.
Figure 6C:
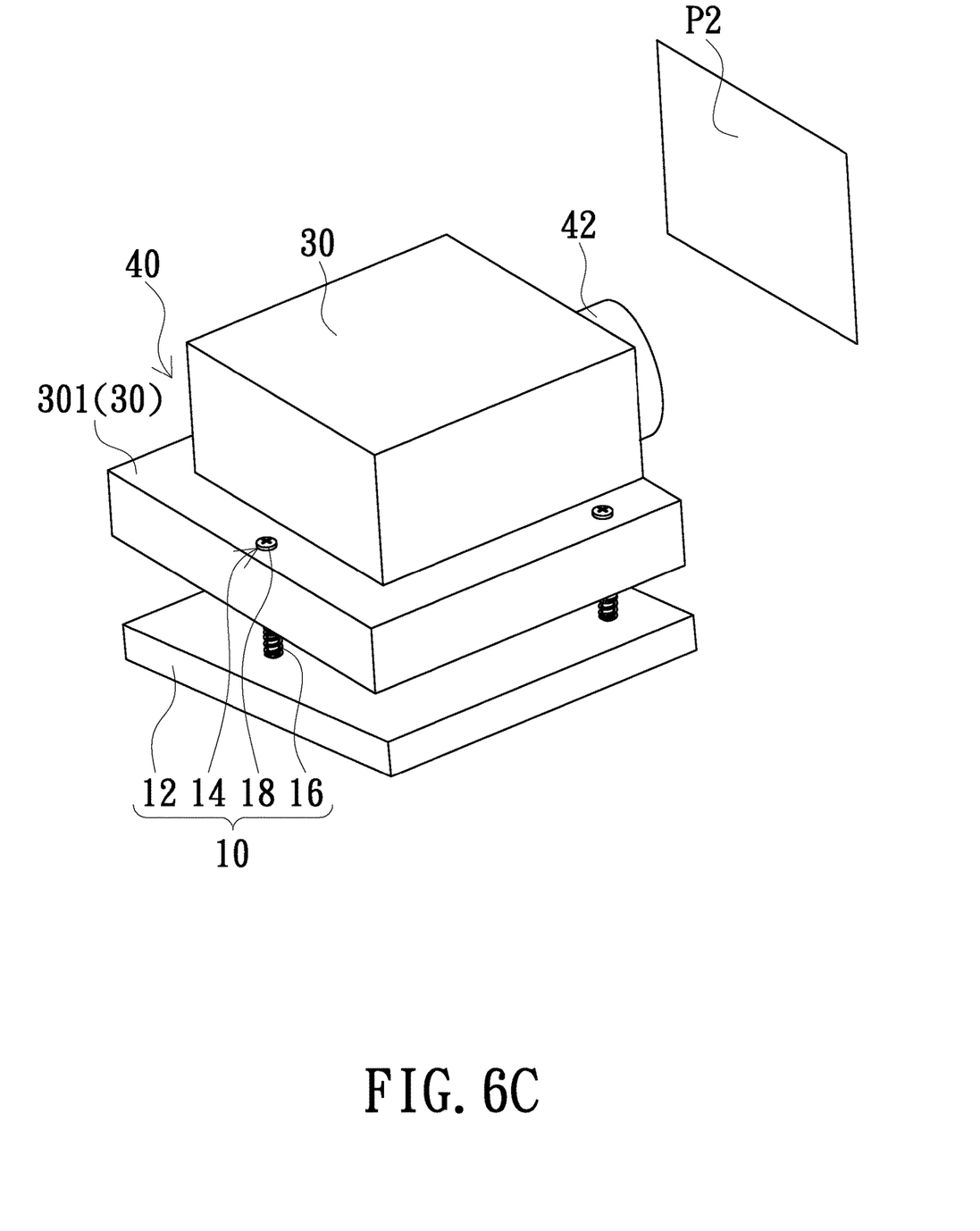

FIG. 6A is a schematic side perspective view of a projection device according to an embodiment of the invention, and FIGS. 6B and 6C are schematic structural views of the projection device of FIG. 6A in different states. The outer casing 43 and the bottom 44 shown in FIG. 6A are omitted from FIGS. 6B and 6C. As shown in FIGS. 6A, 6B, and 6C, the projection device 40 includes an optical engine module 30, a projection lens module 42, an adjustment device 10, and an outer casing 43 (shown only in FIG. 6A). The optical engine module 30, the projection lens module 42 and the adjustment device 10 are located inside the outer casing 43. The outer casing 43 includes a bottom 44 (only shown in FIG. 6A). The bracket 12 of the adjustment device 10 is located between the optical engine module 30 and the bottom 44. The projection lens module 42 is connected to the optical engine module 30 and is used for projecting an image beam out of the projection device 40. The adjustment device 10 includes a bracket 12, at least three adjustment zones 14 (the embodiment is exemplified by three adjustment zones 14, but only two of them are shown in FIGS. 6A, 6B and 6C due to the viewing angle), a flexible element 16, and at least three adjustment elements 18 (the embodiment is exemplified by three adjustment elements 18, but only two of them are shown in FIGS. 6A, 6B and 6C due to the viewing angle). The three adjustment zones 14 in the embodiment are evenly distributed at the optical engine module 30. In an embodiment, the optical engine module 30 includes a fixing base 301, and the at least three adjustment zones 14 are evenly distributed on the fixing base 301. The quantity of the flexible elements 16 may correspond to the quantity of the adjustment elements 18, for example, three, and the three flexible elements 16 are respectively abutted between the bracket 12 and the adjustment zones 14. The quantity of flexible elements 16 may also be one, and the single flexible element 16 is abutted between the bracket 12 and the supporting zone 32 (shown in FIG. 5) surrounded by the three adjustment zones 14. The configuration relationship between the flexible element 16, the bracket 12 and the adjustment zone 14/the supporting zone 32 and the adjustment manner of the adjustment element 18 have been described in the adjustment devices of the first to fourth embodiments, and no redundant detail is to be given herein. Further, the adjustment devices 10A, 10B and 10C may be used in the projection device 40 instead of the adjustment device 10.

In an embodiment as shown in FIG. 6B, the projection lens module 42 projects the image beam in a direction away from the optical engine module 30, for example, in a direction toward the front side of the projection device 40. The front side of the projection device 40 is provided with, for example, a screen (not shown), on which a projection image P1 is displayed. In an embodiment, the three adjustment elements 18 are adjusted to drive the up-down movement of the three adjustment zones 14 of the optical engine module 30 when an unexpected skew, such as a trapezoid or an inverted trapezoid shape, is generated in the projection image P1. As shown in FIG. 6C, the distances between the three different adjustment zones 14 and the bracket 12 are not the same. Since the three adjustment zones 14 are evenly distributed at the optical engine module 30, the adjustment of the three adjustment elements 30 may respectively drive the up-down movement of the three adjustment zones 14; as such, the position of the optical engine module 30 is adjusted by the plane constructed by the three adjustment zones 14, the skew of the projection image P1 (shown in FIG. 6B) projected by the projection lens module 42 is adjusted, and therefore an optimized projection image P2 is obtained. In an embodiment, the opposite sides of the projection image P2 are substantially parallel to each other.

Figure 7A:
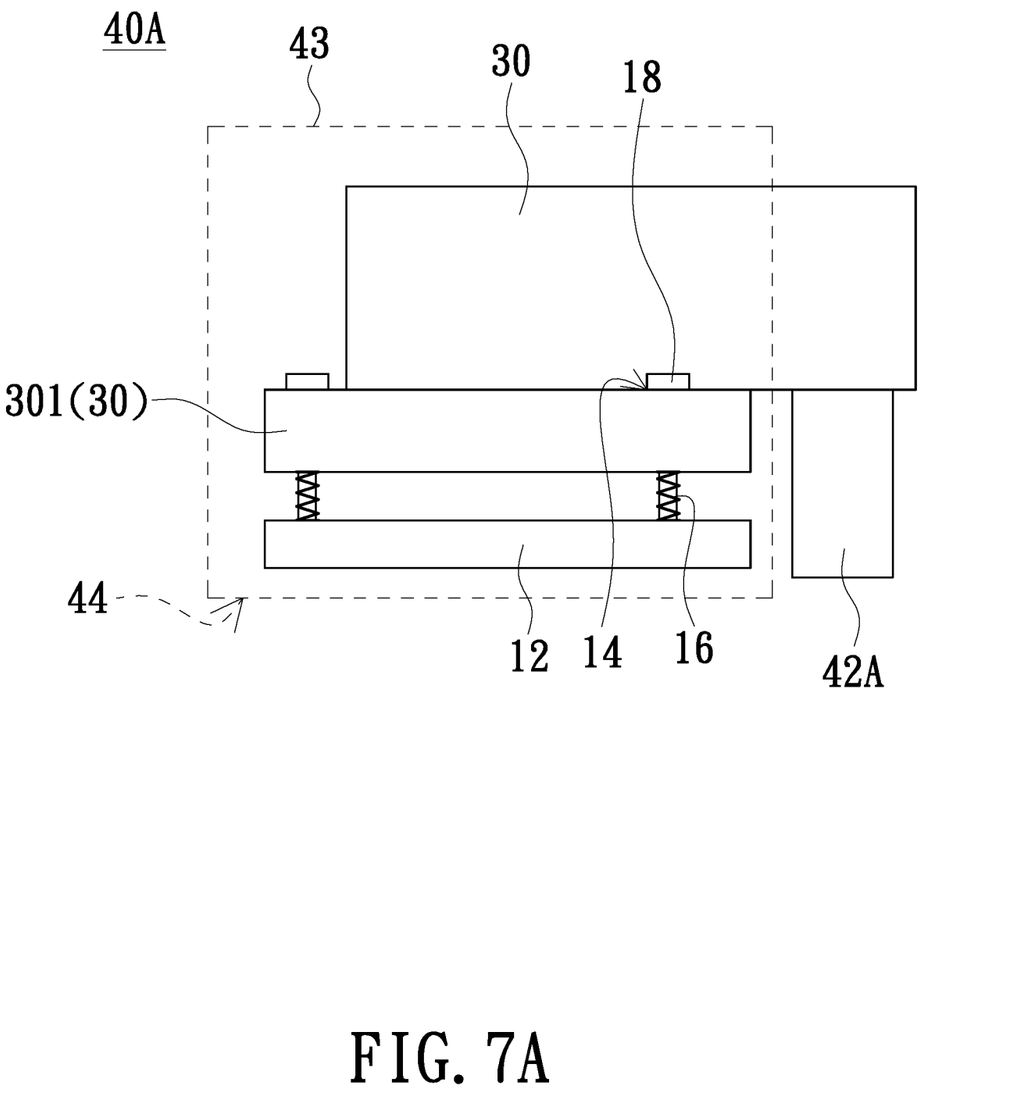
FIG. 7A is a schematic side perspective view of a projection device according to another embodiment of the invention.
Figure 7B:
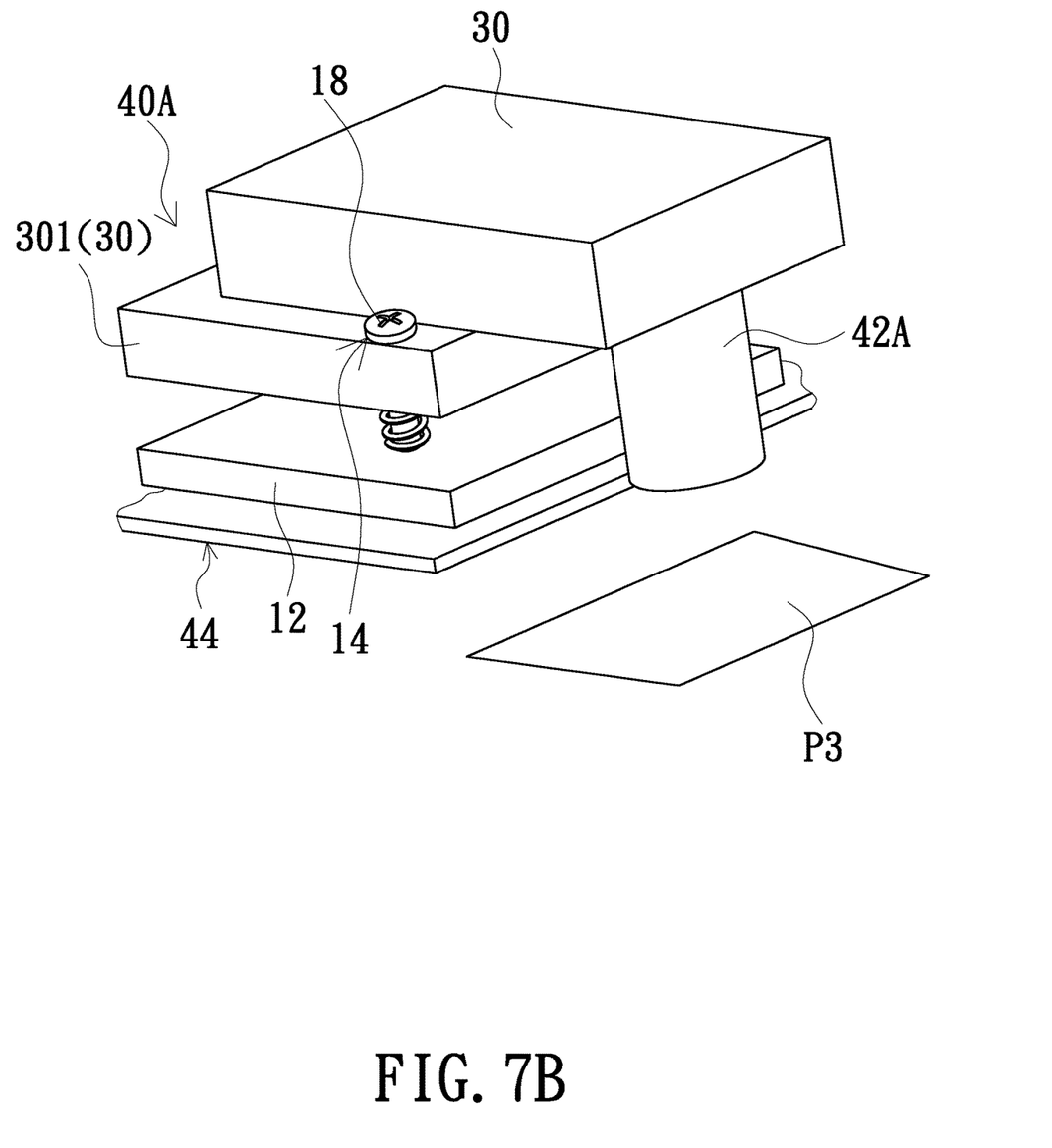
FIGS. 7B and 7C are schematic structural views of the projection device of FIG. 7A in different states.
Figure 7C:
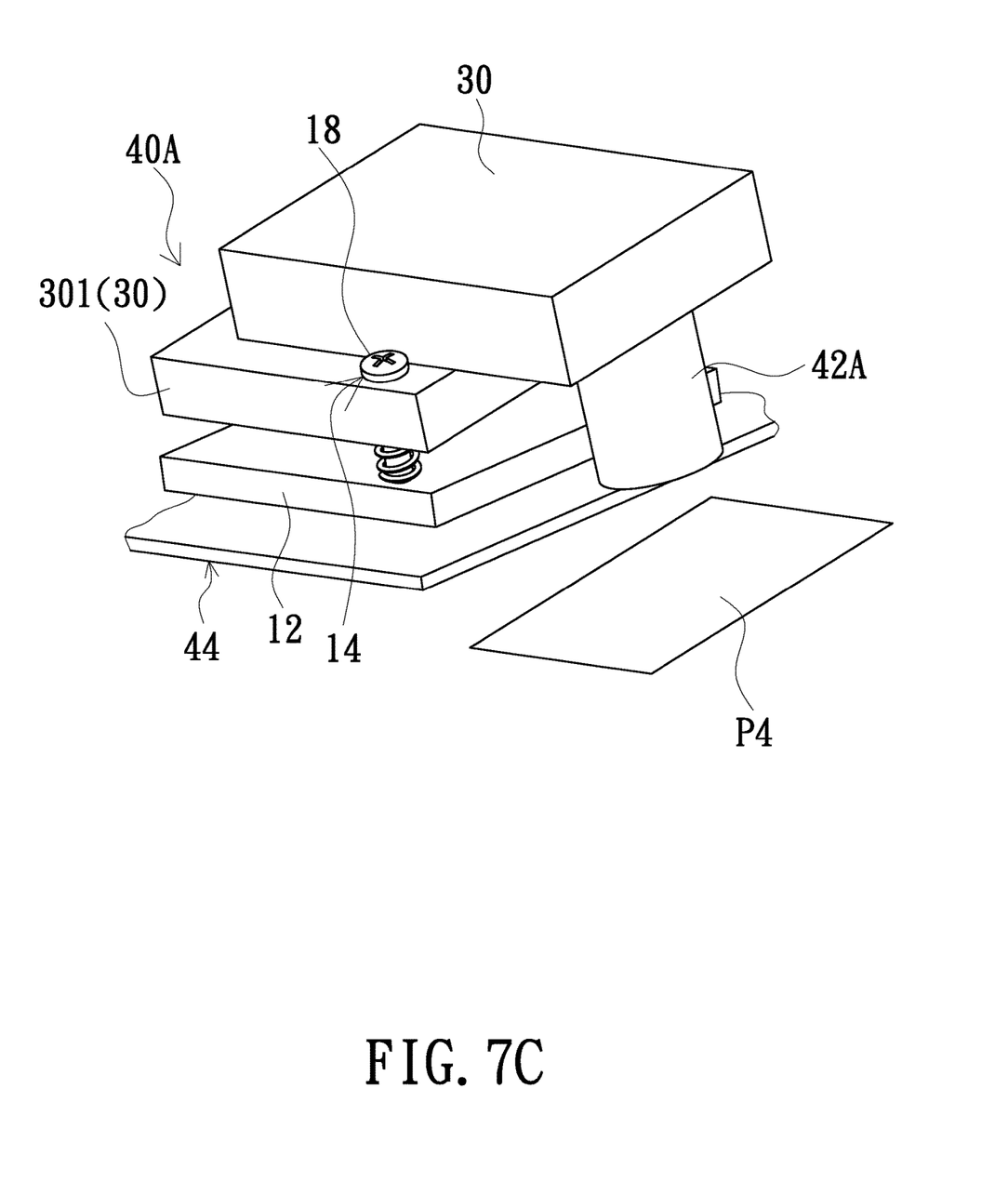

FIG. 7A is a side perspective view of a projection device according to another embodiment of the invention, and FIGS. 7B and 7C are schematic structural views of the projection device of FIG. 7A in different states. The outer casing 43 shown in FIG. 7A is omitted from FIGS. 7B and 7C. The projection device 40A shown in FIGS. 7A, 7B, and 7C differs from the above-described projection device 40 in that the projection lens module 42A projects the image beam in a different direction. As shown in FIG. 7A, the projection device 40A includes an outer casing 43, and the outer casing 43 includes a bottom 44. Refer to FIGS. 7A, 7B and 7C together. The bracket 12 of the adjustment device is located between the optical engine module 30 and the bottom 44. The projection lens module 42A faces, for example, the bottom 44 and projects the image beam onto a plane (not shown) parallel to the bottom 44. In an embodiment, the above plane parallel to the bottom 44 is, for example, a table top or a horizontal display surface, on which the projected image P3 is displayed. In an embodiment, the three adjustment elements 18 are adjusted to drive the up-down movement of the three adjustment zones 14 of the optical engine module 30 when an unexpected skew, such as a trapezoid or an inverted trapezoid shape, is generated in the projection image P3. As shown in FIG. 7C, the distances between the three different adjustment zones 14 and the bracket 12 are not the same. Since the three adjustment zones 14 are evenly distributed at the optical engine module 30, the adjustment of the three adjustment elements 30 may respectively drive the up-down movement of the three adjustment zones 14; as such, the position of the optical engine module 30 is adjusted by the plane constructed by the three adjustment zones 14, the skew of the projection image P3 (shown in FIG. 7B) projected by the projection lens module 42A is adjusted, and therefore an optimized projection image P4 is obtained. Further, the adjustment devices 10A, 10B and 10C may be used in the projection device 40A instead of the adjustment device 10.

The adjustment by using the adjustment element 18 may be performed while observing whether the skew of the projection image is in conformity with the specification. The adjustment is stopped when the skew of the projection image is in conformity with the specification, and the adjustment element 18 is fixed in a dispensing manner, wherein the glue for dispensing is, for example, UV glue or screw glue. The position of the projection images is ensured by the dispensing.

In the projection device of the embodiments of the invention, with the provision of the adjustment device, the projection image may be instantly adjusted without the need to disassemble the optical engine module, thereby greatly saving the working time. Further, the adjustment may be performed while observing the projection image, and therefore the adjustment is easier. Further, no washers are required in the adjustment device, thus avoiding tolerances from conventional washers or cumulative tolerances from multiple washers. Further, the height of the optical engine module may be fine-adjusted to a position within the specification so that the unexpected skew may not be generated in the projection image. Further, under the premise of not necessary to use the metal precision washer with higher unit price, the cost of mold making may be effectively reduced. Further, in the adjustment device, the provision of the flexible element enables the elastic restoring force provided by the flexible element to effectively drive the adjustment element. For example, the outer threads of the thread body of the adjustment screw can be tightly pressed against the inner threads of the screw hole, and therefore the gap between the thread body and the screw hole due to the difference in the respective pitch is eliminated, so as to achieve stability during adjustment and further maintain the stability of adjusting the adjustment zone to a certain height.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An adjustment device for adjusting an up-down displacement of an optical engine module of a projection device, comprising a bracket, at least one adjustment zone, at least one flexible element, at least one adjustment element, and at least one fixing post, wherein:

the bracket is disposed inside the projection device;

the at least one adjustment zone is located at the optical engine module, wherein there is a gap between the optical engine module and the bracket;

the at least one flexible element is abutted between the bracket and the optical engine module; and the at least one adjustment element is movably disposed through the at least one adjustment zone, and a distance between the at least one adjustment zone of the optical engine module and the bracket is at least adjusted by an operation of the at least one adjustment element;

the at least one fixing post disposed on the bracket and located between the bracket and the at least one adjustment zone, wherein the optical engine module comprises a fixing base, the at least one adjustment zone is located at the fixing base, the gap is formed between the fixing base and the bracket, and the at least one flexible element is abutted between the bracket and the fixing base, wherein each of the at least one adjustment element comprises an adjustment screw, the adjustment screw includes a head portion and a thread body, the thread body is connected to the head portion, each of the at least one adjustment zone of the fixing base includes a first surface and a second surface opposite to each other, the second surface faces the bracket, and each of the at least one adjustment zone is provided with a through hole penetrating the first surface and the second surface, wherein each of the at least one fixing post is provided with a second screw hole at least penetrating one end of the at least one fixing post adjacent to the at least one adjustment zone, the second screw hole corresponds to the through hole, the thread body of the adjustment screw is disposed through the through hole and screwed to at least a part of the second screw hole, and the head portion is abutted against the first surface.

2. The adjustment device according to claim 1, wherein the at least one flexible element comprises at least one of a spring and a spring plate.

3. The adjustment device according to claim 1, wherein the at least one flexible element comprises a spring, the spring is sleeved on the at least one fixing post, and opposite ends of the spring are respectively abutted against the bracket and the second surface of the at least one adjustment zone.

4. An adjustment device for adjusting an up-down displacement of an optical engine module of a projection device, comprising a bracket, at least one adjustment zone, at least one flexible element, and at least one adjustment element, wherein:

the bracket is disposed inside the projection device;

the at least one adjustment zone is located at the optical engine module, wherein there is a gap between the optical engine module and the bracket;

the at least one flexible element is abutted between the bracket and the optical engine module; and the at least one adjustment element is movably disposed through the at least one adjustment zone, and a distance between the at least one adjustment zone of the optical engine module and the bracket is at least adjusted by an operation of the at least one adjustment element;

wherein the optical engine module comprises a fixing base, the at least one adjustment zone is located at the fixing base, the gap is formed between the fixing base and the bracket, and the at least one flexible element is abutted between the bracket and the fixing base, wherein each of the at least one adjustment element comprises an adjustment screw, the adjustment screw includes a head portion and a thread body, the thread body is connected to the head portion, each of the at least one adjustment zone of the fixing base includes a first surface and a second surface opposite to each other, the second surface faces the bracket, and each of the at least one adjustment zone is provided with a through hole penetrating the first surface and the second surface, wherein the bracket is provided with at least one first screw hole, each of the at least one first screw hole corresponds to the respective through hole of the each of the at least one adjustment zone, the thread body of the adjusting screw is disposed through the through hole and screwed to at least a part of the first screw hole, and the head portion is abutted against the first surface, wherein the at least one flexible element comprises a spring plate, a perforation is formed in the spring plate, the spring plate is disposed on the bracket, the perforation corresponds to the through hole and the first screw hole, the thread body of the adjustment screw is further disposed through the perforation, and a part of the spring plate is abutted against the second surface of the at least one adjustment zone.

5. An adjustment device for adjusting an up-down displacement of an optical engine module of a projection device, comprising a bracket, at least one adjustment zone, at least one flexible element, and at least one adjustment element, wherein:

the bracket is disposed inside the projection device;

the at least one adjustment zone is located at the optical engine module, wherein there is a gap between the optical engine module and the bracket;

the at least one flexible element is abutted between the bracket and the optical engine module; and the at least one adjustment element is movably disposed through the at least one adjustment zone, and a distance between the at least one adjustment zone of the optical engine module and the bracket is at least adjusted by an operation of the at least one adjustment element, wherein the optical engine module comprises a fixing base, the at least one adjustment zone is located at the fixing base, the gap is formed between the fixing base and the bracket, and the at least one flexible element is abutted between the bracket and the fixing base, wherein a quantity of the at least one adjustment element is at least three, a quantity of the at least one adjustment zone is at least three, the at least three adjustment elements are respectively movably disposed through the at least three adjustment zones, the fixing base further includes a supporting zone located among the at least three adjustment zones, and the at least one flexible element is abutted between the bracket and the supporting zone of the fixing base, wherein the supporting zone is formed with a first engagement slot facing the bracket, the bracket is formed with a second engagement slot corresponding to the first engagement slot, and the at least one flexible element includes opposite ends respectively engaged with the first engagement slot and the second engagement slot.

6. A projection device, comprising an optical engine module, a projection lens module, and an adjustment device, wherein:

the projection lens module is connected to the optical engine module, and the projection lens module is configured to project an image beam out of the projection device; and the adjustment device comprises a bracket, at least three adjustment zones, at least one flexible element, and at least three adjustment elements, wherein:

the at least three adjustment zones are evenly distributed at the optical engine module, wherein there is a gap between the optical engine module and the bracket;

the at least one flexible element is abutted between the bracket and the optical engine module; and the at least three adjustment elements are respectively movably disposed through the at least three adjustment zones, and a distance between at least one of the at least three adjustment zones of the optical engine module and the bracket is at least adjusted by an operation of at least one of the at least three adjustment elements, wherein the optical engine module comprises a fixing base, the at least three adjustment zones are evenly distributed on the fixing base, the gap is formed between the fixing base and the bracket, and the at least one flexible element is abutted between the bracket and the fixing base, wherein the fixing base further includes a supporting zone located among the at least three adjustment zones, the supporting zone is formed with a first engagement slot facing the bracket, the bracket is formed with a second engagement slot corresponding to the first engagement slot, and the at least one flexible element includes opposite ends respectively engaged with the first engagement slot and the second engagement slot.

7. The projection device according to claim 6, wherein a quantity of the at least one flexible element is at least three, and the at least three flexible elements are respectively abutted between the bracket and the at least three adjustment zones.

8. The projection device according to claim 6, wherein the projection device includes a bottom, the bracket is located between the fixing base and the bottom, and the projection lens module projects the image beam toward a plane parallel to the bottom.

* * * * *